US008830817B2

(12) United States Patent
Choi et al.

(10) Patent No.: US 8,830,817 B2
(45) Date of Patent: Sep. 9, 2014

(54) APPARATUS OF MULTIPLEXING DATA TRANSMISSION PATH FOR WIRELESS SENSOR NETWORK

(75) Inventors: Sun-San Choi, Gangneung-si (KR); Tae-Yun Chung, Gangneung-si (KR); Lae-Jeong Park, Gangneung-si (KR)

(73) Assignee: Gangneung-Wonju National University Industry Academy Cooperation Group (KR)

( * ) Notice: Subject to any disclaimer, the term of this patent is extended or adjusted under 35 U.S.C. 154(b) by 411 days.

(21) Appl. No.: 13/311,668

(22) Filed: Dec. 6, 2011

(65) Prior Publication Data

US 2012/0147731 A1 Jun. 14, 2012

(30) Foreign Application Priority Data

Dec. 8, 2010 (KR) .................. 10-2010-0124632

(51) Int. Cl.
*H04J 3/06* (2006.01)
*H04J 1/16* (2006.01)
*H04W 4/00* (2009.01)
*H04L 29/08* (2006.01)

(52) U.S. Cl.
CPC ..................................... *H04L 67/12* (2013.01)
USPC .......................................... 370/216; 455/465

(58) Field of Classification Search
CPC . H04W 4/006; H04W 52/0212; H04W 84/20; H04W 84/18; H04L 12/4035; H04L 41/00; H04B 7/268; H04J 3/0641; H04J 3/0688
USPC ................ 395/182.11, 550; 370/86; 455/465; 710/61
See application file for complete search history.

(56) References Cited

U.S. PATENT DOCUMENTS

| 4,276,488 | A | * | 6/1981 | Benedict et al. ............... 327/202 |
| 4,677,614 | A | * | 6/1987 | Circo .............................. 370/222 |
| 5,455,935 | A | * | 10/1995 | Taylor et al. ................... 713/401 |
| 5,822,512 | A | * | 10/1998 | Goodrum et al. ............... 714/13 |
| 6,356,765 | B1 | * | 3/2002 | McCrank et al. .............. 455/465 |
| 6,421,688 | B1 | * | 7/2002 | Song ..................................... 1/1 |
| 2006/0132209 | A1 | * | 6/2006 | Meltzer et al. ................. 327/202 |
| 2010/0064074 | A1 | * | 3/2010 | Hansquine et al. ............. 710/61 |

* cited by examiner

*Primary Examiner* — Jung Park
*Assistant Examiner* — Chuong M Nguyen
(74) *Attorney, Agent, or Firm* — Cantor Colburn LLP (57) ABSTRACT

The present invention is to provide a method and apparatus for multiplexing a sync node and a gateway of a wireless sensor network, which is capable of allowing communication of the wireless sensor network to be normally performed by multiplexing paths of the sync node and the gateway of the wireless sensor network even in the case where any one of the sync node and the gateway abnormally operates and by transmitting upstream data and downstream data through a path selected among the duplexed paths according to characteristics of the wireless sensor network.

8 Claims, 7 Drawing Sheets

| OPERATION STATE | J (SLAVE) | K (MASTER) | /PRE (SLAVE) | /CLR (MASTER) | SELECTION SIGNAL | OUTPUT |
|---|---|---|---|---|---|---|
| MASTER APPARATUS: ACTIVATED SLAVE APPARATUS: INACTIVATED | L | H | H | H | L | MASTER |
| MASTER APPARATUS: ABNORMAL SLAVE APPARATUS: ACTIVATED | H | X | L | X | H | SLAVE |
| MASTER APPARATUS: INACTIVATED SLAVE APPARATUS: ACTIVATED | H | L | H | H | H | SLAVE |
| MASTER APPARATUS: ACTIVATED SLAVE APPARATUS: ABNORMAL | X | H | X | L | L | MASTER |

APPARATUS OF MULTIPLEXING DATA TRANSMISSION PATH FOR WIRELESS SENSOR NETWORK

CROSS-REFERENCE TO RELATED PATENT APPLICATION

This application claims the benefit of Korean Patent Application No. 10-2010-0124632, filed on Dec. 8, 2010, in the Korean Intellectual Property Office, the disclosure of which is incorporated herein in its entirety by reference.

BACKGROUND OF THE INVENTION

1. Field of the Invention

The present invention relates to a wireless sensor network, and more particularly, to a path multiplexing apparatus in a wireless sensor network.

2. Description of the Prior Art

Figure 1:
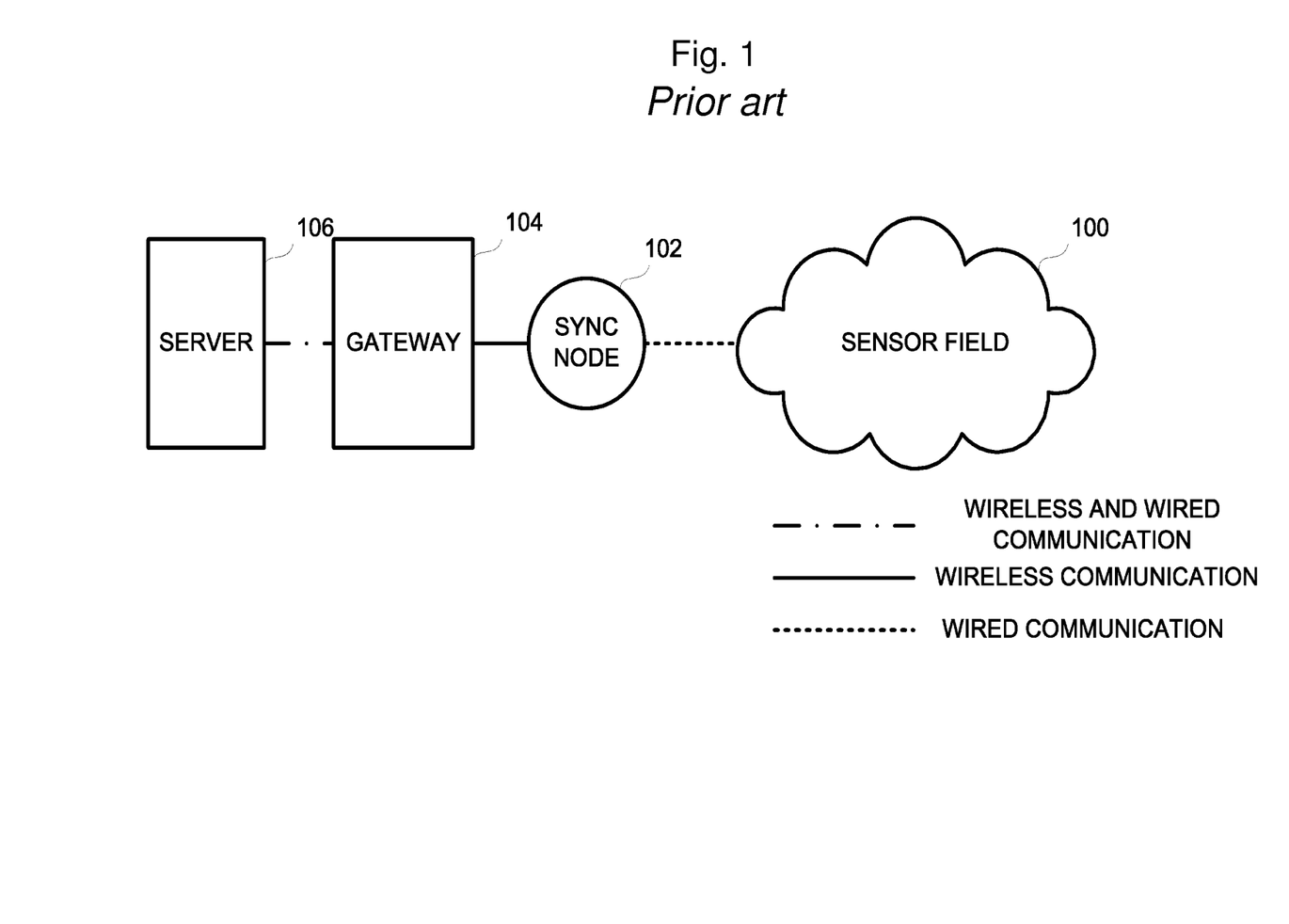
FIG. 1 is a diagram illustrating a configuration of a conventional wireless sensor network.

Referring to FIG. 1, a wireless sensor network (WSN) may be configured to include: a sensor field 100 which includes a group of sensor nodes; a sync node 102 which transmits upstream data which are information collected by the sensor nodes of the sensor field 100 to a gateway 104 and transmits downstream data from the gateway 104 to the sensor nodes of the sensor field 100; and a gateway 104 which routes the upstream data which are information transmitted from the sync node 102 to transmit the upstream data to a server 106 through a wide band communication network and transmits the downstream data from the server 106 to the sync node 102.

As described above, in the wireless sensor network, the upstream data from the sensor nodes of the sensor field 100 are transmitted to the server 106 through a single path formed by the sync node 102 and the gateway 104, and the downstream data from the server 106 are also transmitted to the sensor nodes of the sensor field 100 through the single path formed by the sync node 102 and the gateway 104.

In this manner, since only the single path exists between the sensor field 100 including a plurality of the sensor nodes and the server 106, in the case where one of the sync node 102 and the gateway 104 abnormally operates, there is a problem in that the entire wireless sensor network fails to operate.

SUMMARY OF THE INVENTION

The present invention is to provide a method and apparatus for multiplexing a sync node and a gateway of a wireless sensor network, which is capable of allowing communication of the wireless sensor network to be normally performed by multiplexing paths of the sync node and the gateway of the wireless sensor network even in the case where any one of the sync node and the gateway abnormally operates and by transmitting upstream data and downstream data through a path selected among the duplexed paths according to characteristics of the wireless sensor network.

According to an aspect of the present invention, there is provided a path multiplexing apparatus in a wireless sensor network including: a master apparatus; a slave apparatus; and a control module, wherein the control module selectively transmits any one of data supplied by the master apparatus and the slave apparatus to a next system according to control signals supplied by the master apparatus and the slave apparatus, wherein in an activated state, the master apparatus supplies a control signal for allowing data of the master apparatus to be output and monitors an operation state of the slave apparatus, and in the case where the slave apparatus abnormally operates, the master apparatus supplies a reset signal to the slave apparatus, and wherein in an inactivated state, the slave apparatus monitors an operation state of the master apparatus, and in the case where the master apparatus abnormally operates, the slave apparatus is transitioned into an activated state to supply a reset signal to the master apparatus and supply a control signal for allowing data of the slave apparatus to be output to the control module.

According to the present invention, even in the case where any one of the sync node and the gateway of the wireless sensor network abnormally operates, it is possible to allow the communication of the wireless sensor network to be normally performed.

DETAILED DESCRIPTION OF THE INVENTION

In the present invention, even in the case where any one of a sync node and a gateway abnormally operates, communication of a wireless sensor network is allowed to be normally performed by duplexing paths of the sync node and the gateway of the wireless sensor network.

[Configuration of Wireless Sensor Network]

Figure 2:
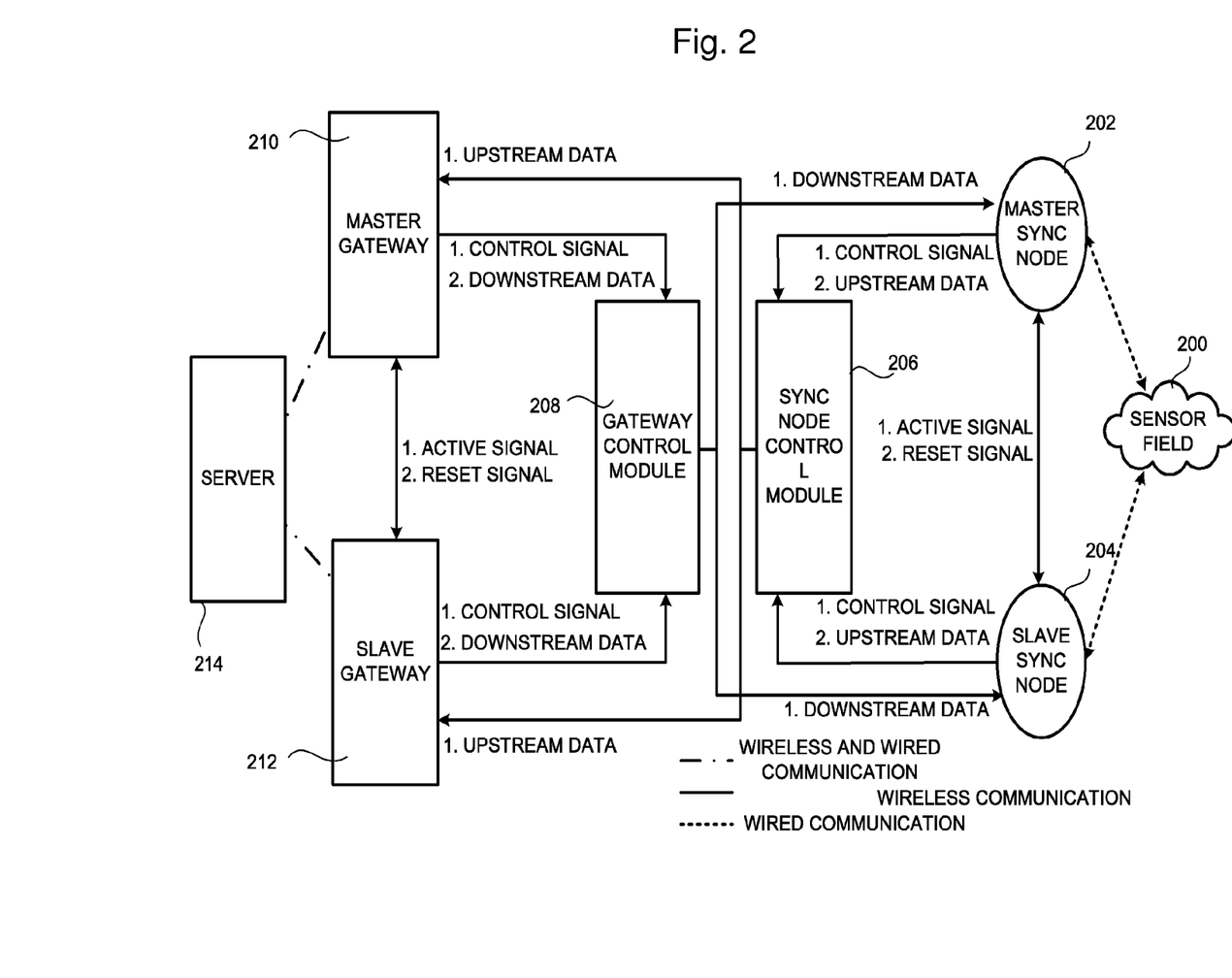
FIG. 2 is a diagram illustrating a configuration of a wireless sensor network according to an embodiment of the present invention.

The configuration of the wireless sensor network according to an embodiment of the present invention will be described with reference to FIG. 2.

The wireless sensor network is configured to include: a sensor field 200 which includes a group of sensor nodes; a master sync node 202 and a slave sync node 204 which receive upstream data from the sensor nodes of the sensor field 200 to transmit the upstream data to a sync node control module 206, receive downstream data from a gateway control module 208 to transmit the downstream data to the sensor nodes of the sensor field 200, and transmits a control signal to the sync node control module 206; a sync node control module 206 which receives the control signal and the upstream data from the master sync node 202 and the slave sync node 204 and selects the upstream data from any one of the master sync node 202 and the slave sync node 204 to transmit the upstream data to the master gateway 210 and the slave gateway 212; a master gateway 210 and a slave gateway 212 which receives the upstream data from the sync node control module 206 to transmit the upstream data to a server 214, receives the downstream data from the server 214 to transmit the upstream data to the gateway control module 208, and transmits the control signal to the gateway control module 208; and a gateway control module 208 which receives the control signal and the downstream data from the master gateway 210 and the slave gateway 212 and selects the downstream data from any one thereof to transmit the downstream data to the master sync node 202 and the slave sync node 204.

[Configuration of Duplexing Apparatus]

Figure 3:
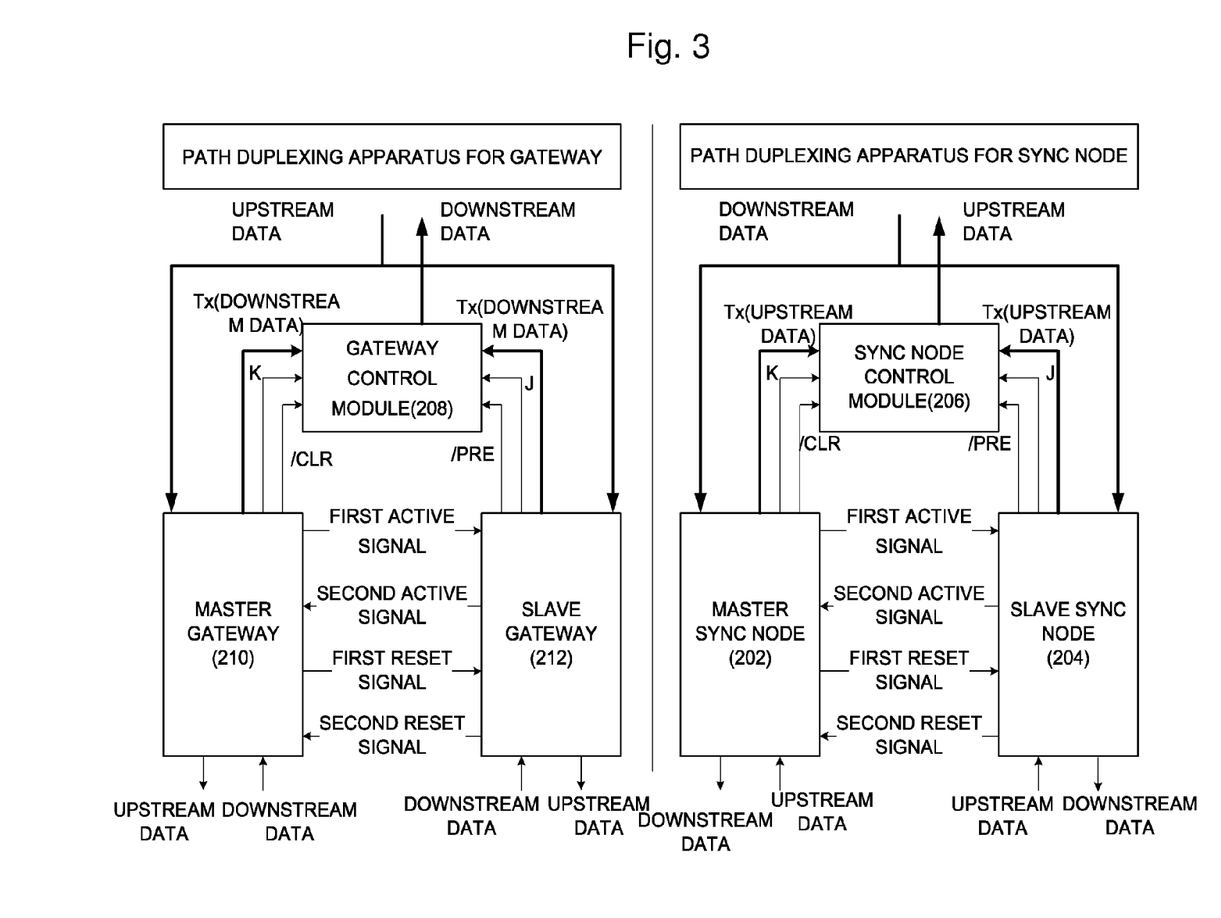
FIG. 3 is a diagram illustrating a configuration of a path multiplexing apparatus according to an embodiment of the present invention.

The configuration of the path duplexing apparatus according to an embodiment of the present invention will be described in detail with reference to FIG. 3.

[Path Duplexing Apparatus for Gateway]

The path duplexing apparatus for a gateway according to the present invention includes a master gateway 210, a slave gateway 212, and a gateway control module 208.

First, the upstream data are input to each of the master gateway 210 and the slave gateway 212. The upstream data are transmitted to the server as the next system by an activated gateway among the master gateway 210 and the slave gateway 212.

In addition, the gateway control module 208 selectively outputs the downstream data from an activated gateway among the master gateway 210 and the slave gateway 212 to transmit the downstream data to the sync node as the next system.

During the normal operation, the master gateway 210 periodically supplies a first active signal to the slave gateway 212 to inform that the master gateway 210 normally operates, and the master gateway 210 monitors a second active signal from the slave gateway 212 to check whether or not the slave gateway 212 normally operates. In the case where it is determined that the slave gateway 212 does not normally operate, the master gateway 210 supplies a second reset signal to the slave gateway 212 to reset the slave gateway 212.

In addition, during the normal operation, the master gateway 210 is selectively activated according to the operation state of the slave gateway 212 to output the upstream data and the downstream data received by the master gateway 210. Particularly, the master gateway 210 supplies a control signal (K, /CLR) for allowing the downstream data received by the master gateway 210 to be selectively output according to the state thereof and the downstream data to the gateway control module 208.

Next, the master gateway 210 is reset according to a first reset signal supplied by the slave gateway 212.

In addition, during the normal operation, the slave gateway 212 periodically supplies the second active signal to the master gateway 210 to inform that the slave gateway 212 normally operates, and the slave gateway 212 monitors the first active signal from the master gateway 210 to check whether or not the master gateway 210 normally operates. In the case where it is determined that the master gateway 210 does not normally operates, the slave gateway 212 supplies the first reset signal to the master gateway 210 to reset the master gateway 210.

In addition, during the normal operation, the slave gateway 212 is selectively activated according to the operation state of the master gateway 210 to output the upstream data and the downstream data received by the slave gateway 212. Particularly, the slave gateway 212 supplies a control signal (J, /PRE) for allowing the downstream data received by the slave gateway 212 to be selectively output according to the state thereof and the downstream data to the gateway control module 208.

Next, the slave gateway 212 is reset according to a second reset signal supplied by the master gateway 210.

[Path Duplexing Apparatus for Sync Node]

The path duplexing apparatus for a sync node according to the present invention includes a master sync node 202, a slave sync node 204, and a sync node control module 206.

First, the downstream data are input to each of the master sync node 202 and the slave sync node 204. The downstream data are transmitted to the sensor nodes of the sensor field 200 as the next systems by an activated sync node among the master sync node 202 and the slave sync node 204.

In addition, the upstream data are input to each of the master sync node 202 and the slave sync node 204. The upstream data are supplied to the sync node control module 206, and the sync node control module 206 transmits the upstream data to the master gateway 210 and the slave gateway 212 as the next systems by an activated sync node among the master sync node 202 and the slave sync node 204.

During the normal operation, the master sync node 202 periodically supplies the first active signal to the slave sync node 204 to inform that the master sync node 202 normally operates, and the master sync node 202 monitors the second active signal from the slave sync node 204 to check whether or not the slave sync node 204 normally operates. In the case where it is determined that the slave sync node 204 does not normally operates, the master sync node 202 supplies the second reset signal to the slave sync node 204 to reset the slave sync node 204.

In addition, during the normal operation, the master sync node 202 is selectively activated according to the operation state of the slave sync node 204 to output the upstream data and the downstream data received by the master sync node 202. Particularly, the master sync node 202 supplies a control signal (K, /CLR) for allowing the upstream data thereof to be selectively output according to the state thereof and the upstream data to the sync node control module 206.

Next, the master sync node 202 is reset according to the first reset signal supplied by the slave sync node 204.

In addition, during the normal operation, the slave sync node 204 periodically supplies the second active signal to the master sync node 202 to inform that the slave sync node 204 normally operates, and the slave sync node 204 monitors the first active signal from the master sync node 202 to check whether or not the master sync node 202 normally operates. In the case where it is determined that the master sync node 202 does not normally operates, the slave sync node 204 supplies the first reset signal to the master sync node 202 to reset the master sync node 202.

In addition, during the normal operation, the slave sync node 204 is selectively activated according to the operation state of the master sync node 202 to output the upstream data and the downstream data received by the slave sync node 204. Particularly, the slave sync node 204 supplies a control signal (J, /PRE) for allowing the upstream data received by the slave sync node 204 to be selectively output according to the state thereof and the upstream data to the sync node control module 206.

Next, the slave sync node 204 is reset according to the second reset signal supplied by the master sync node 202.

[Configuration of Control Module]

Since the configuration and operations of the gateway control module 208 are the same as those of the sync node control module 206, only the configuration and operations of one control module will be described in detail.

Figure 4:
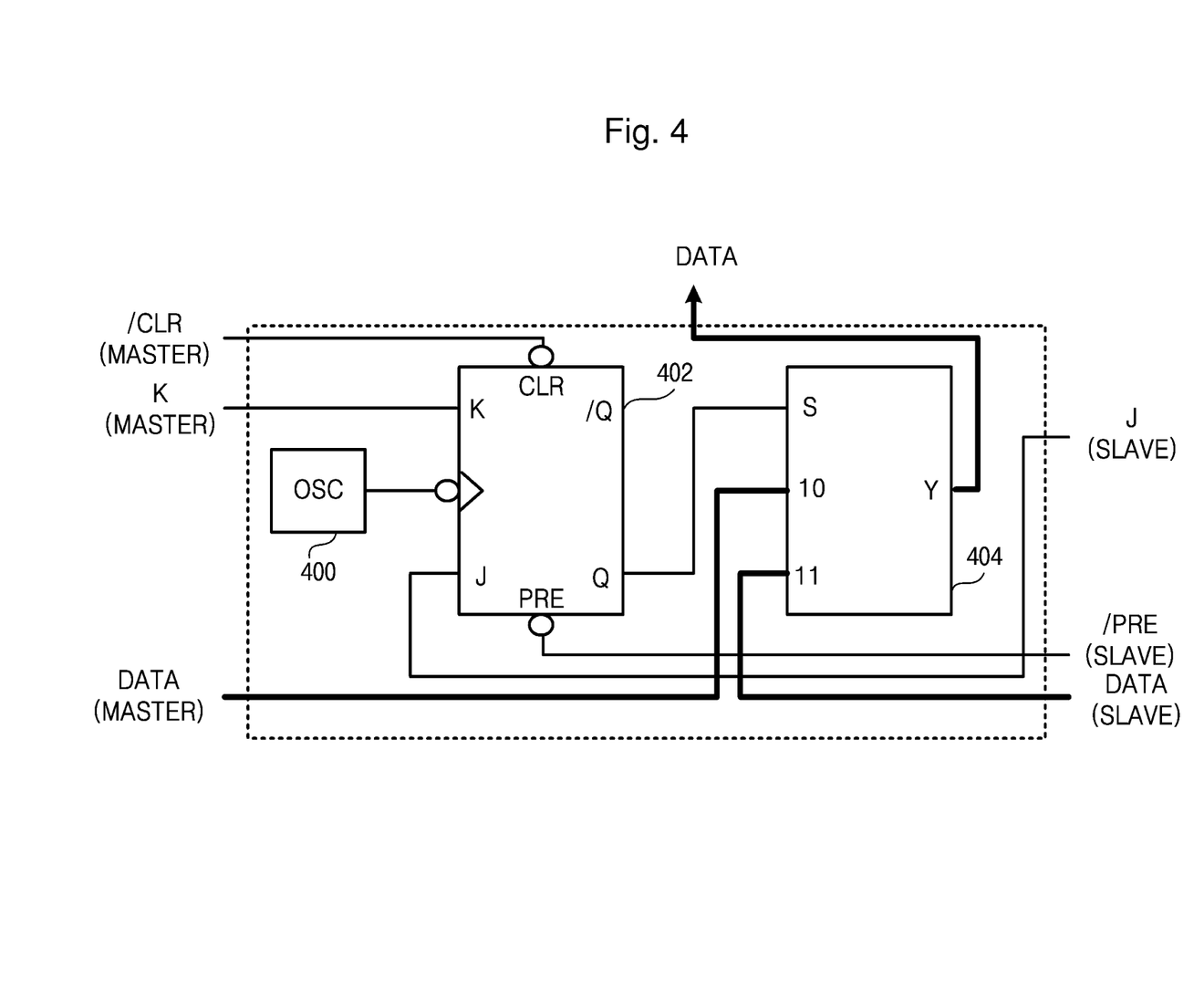
FIG. 4 is a diagram illustrating a detailed configuration of a control module of FIG. 3.

Referring to FIG. 4 illustrating the configuration of the control module according to the present invention, the control module includes an oscillator 400, a JK flip-flop 402, and a MUX 404. The oscillator 400 supplies a driving clock of the JK flip-flop 402. The JK flip-flop 402 receives control signals from the master apparatus 300 through /CLR and K ports and receives control signals from the slave apparatus 302 through /PRE and J ports to output an output Q as a selection signal of the MUX 404. The MUX 404 selectively outputs the data from the master apparatus or the slave apparatus according to the selection signal output from the JK flip-flop 402. In other words, in the case where the control module is the gateway control module 208, the MUX 404 selectively outputs one of the downstream data supplied by the master gateway 210 and the slave gateway 212. In the case where the control module is the sync node control module 206, the MUX 404 selectively outputs one of the upstream data supplied by the master sync node 202 and the slave sync node 204.

[Control Signal and Output State of Control Module]

Figure 5:
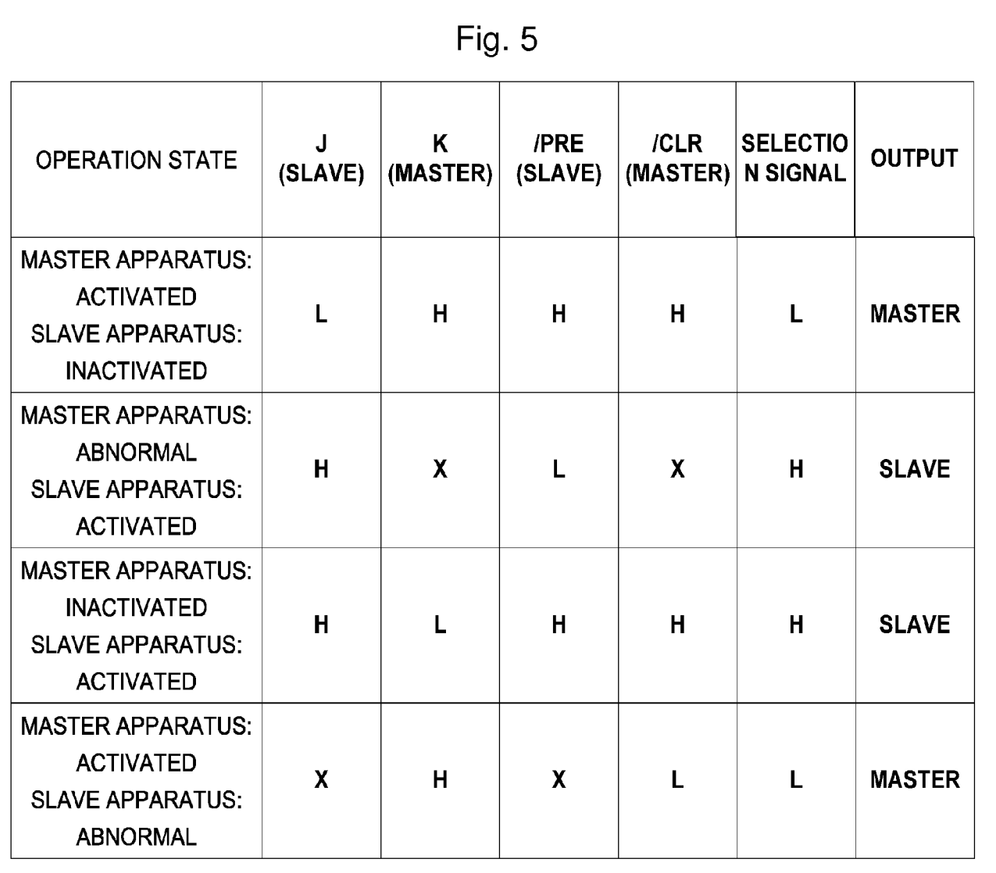
FIG. 5 is a table listing functions of control signals according to an embodiment of the present invention.

The operation of the control module and the output states of the MUX 404 with respect to the control signals will be described with reference to FIG. 5.

First, the first operation state denotes a state where the master apparatus is activated and the slave apparatus is inactivated in the state where the master apparatus and the slave apparatus normally operate. In this case, the master apparatus supplies an H signal through the K port and supplies the H signal through the /CLR port, and the slave apparatus supplies an L signal through the J port and supplies the H signal through the /PRE port. Therefore, the JK flip-flop 402 is allowed to output a selection signal L. In this case, the MUX 404 selectively outputs the data from the master apparatus according to the selection signal L.

Next, the second operation state denotes a state where the activated master apparatus abnormally operates, so that the slave apparatus inactivated in the normal operation state becomes activated. In this case, the master apparatus supplies an X signal through the K port and supplies the X signal through the /CLR port, and the slave apparatus supplies the H signal through the J port and supplies the L signal through the /PRE port. Therefore, the JK flip-flop 402 is allowed to output a selection signal H. In this case, the MUX 404 selectively outputs the data from the slave apparatus according to the selection signal H. Herein, the X signal denotes an H signal or an L signal.

Next, the third operation state denotes a state where the master apparatus which abnormally operates is reset by the first reset signal from the slave apparatus to be allowed to normally operate but it is transitioned into an inactivated state and the slave apparatus is maintained in the activated state. In this case, the master apparatus supplies the L signal through the K port and supplies the H signal through the /CLR port, and the slave apparatus supplies the H signal through the J port and supplies the H signal through the /PRE port. Therefore, the JK flip-flop 402 is allowed to output the selection signal H. In this case, the MUX 404 selectively outputs the data from the slave apparatus according to the selection signal H.

Next, the fourth operation state denotes a state where the activated slave apparatus abnormally operates, so that the master apparatus which normally operates and is inactivated is transitioned into an activated state. In this case, the master apparatus supplies the H signal through the K port and supplies the L signal through the /CLR port, and the slave apparatus supplies the X signal through the J port and supplies the X signal through the /PRE port. Therefore, the JK flip-flop 402 is allowed to output the selection signal L. In this case, the MUX 404 selectively outputs the data from the master apparatus according to the selection signal L.

As described above, the control modules selectively output any one of the data from the master apparatus and the slave apparatus according to the control signals supplied by the master apparatus and the slave apparatus.

Now, a process where the master apparatus and the slave apparatus supply different control signals according to the operation states will be described in detail. Herein, the master apparatus denotes the master sync node 202 or the master gateway 210, and the slave apparatus denotes the slave sync node 204 or the slave gateway 212.

[Operation of Master Apparatus]

Figure 6:
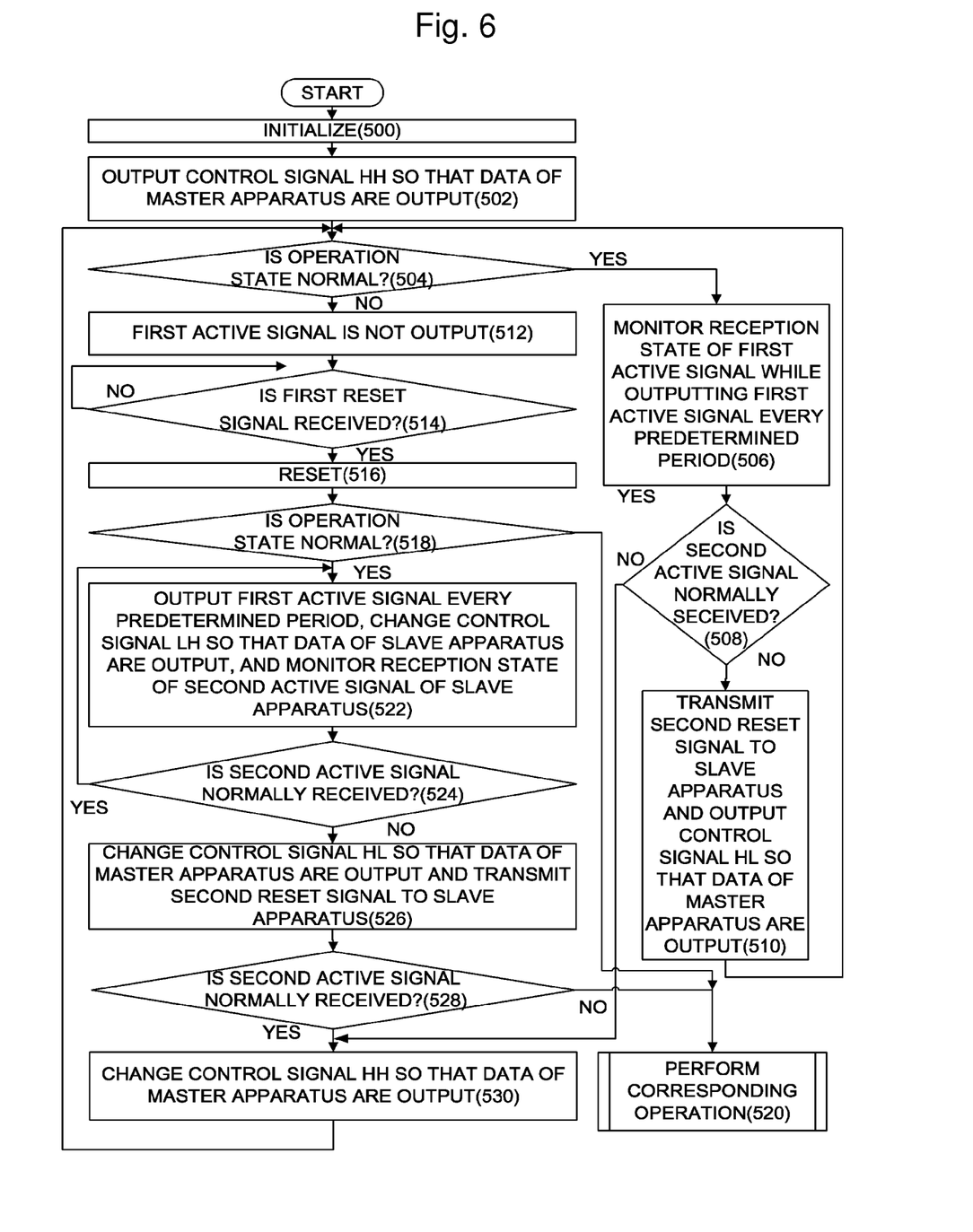
FIG. 6 is a flowchart illustrating processes of a master apparatus according to an embodiment of the present invention.

Operations of the master apparatus are described with reference to FIG. 6.

After the master apparatus is reset (Step S500), the master apparatus proceeds into an activated state to output a control signal (K port: H, /CLR port: H) so that the data of the master apparatus are output (Step S502). In this case, after the slave apparatus is also reset, the slave apparatus outputs a control signal (J port: L, /PRE port: H) so that the data of the master apparatus are selectively output.

In this state, the master apparatus checks whether or not the master apparatus normally operates (Step S504). If it is determined that the master apparatus normally operates, the master apparatus monitors the reception state of the second active signal in order to check whether or not the slave apparatus normally operates while outputting the first active signal with a predetermined period (Step S506).

If it is determined that the second active signal is not normally received (Step S508), the master apparatus transmits the second reset signal to the slave apparatus and outputs the control signal (K port: H, the /CLR port: L) so that the data of the master apparatus are output (Step S510).

If it is determined that the master apparatus does not normally operates, the master apparatus cannot output the first active signal (Step S512). In this case, the abnormal operation of the master apparatus is sensed by the slave apparatus which monitors the first active signal, so that the first reset signal is supplied to the master apparatus.

If the first reset signal is received, the master apparatus performs resetting. If the normal operation is performed due to the resetting, the master apparatus proceeds into an inactivated state to output the first active signal with a predetermined period and to change the control signal (K port: L, /CLR port: H) so that the data of the slave apparatus are output, and the master apparatus monitors the reception state of the second active signal of the slave apparatus (Step S522).

If the second active signal is not normally received, the master apparatus proceeds into an activated state to change the control signal (K port: H, /CLR port: L) so that the data of the master apparatus are output and to transmits the second reset signal to the slave apparatus (Step S526).

After the second reset signal is transmitted, the master apparatus checks the reception state of the second active signal (Step S528). If the reception state of the second active signal is normal, the master apparatus determines that the slave apparatus normally operates and changes the control signal (K port: H, /CLR port: H) for the control module according to the control signal (the J port: L, /PRE port: H) of the slave apparatus which is reset to be in the inactivated state so that the data of the master apparatus are output (Step S530).

[Operation of Slave Apparatus]

Figure 7:
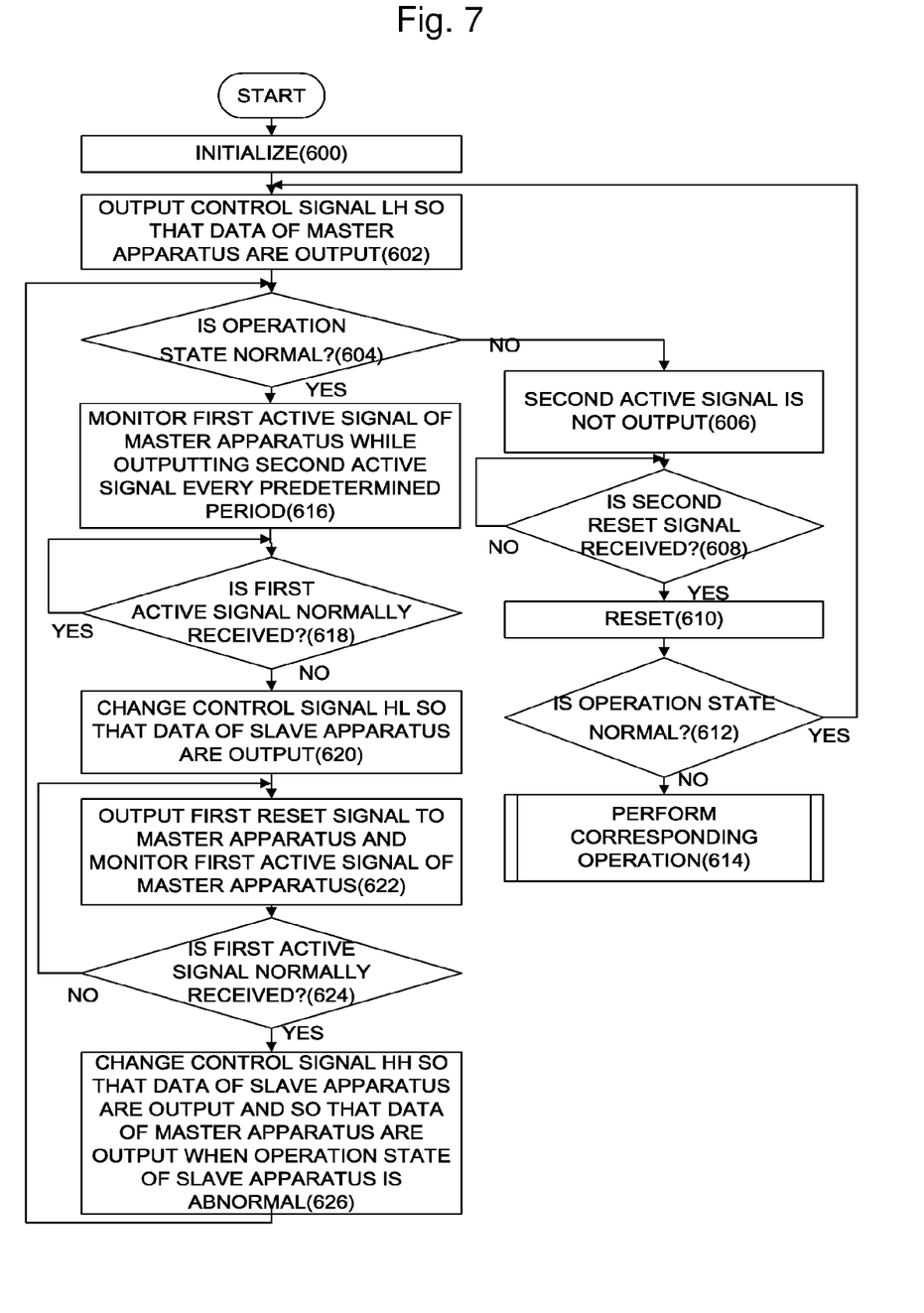
FIG. 7 is a flowchart illustrating processes of a slave apparatus according to an embodiment of the present invention.

Now, operations of the slave apparatus are described with reference to FIG. 7.

After the slave apparatus is reset (Step S600), the slave apparatus proceeds into an inactivated state to output a control signal (J port: L, /PRE: H) so that the data of the master apparatus are output (Step S602). In this case, after the master apparatus is also reset, the master apparatus outputs a control signal (K port: H, /CLR port: H) so that the data of the master apparatus are selectively output.

Next, the slave apparatus checks whether or not the slave apparatus normally operates (Step S604). If it is determined that the slave apparatus normally operates, the slave apparatus monitors the first active signal of the master apparatus while outputting the second active signal with a predetermined period (Step S616).

If it is determined that the slave apparatus does not normally operates, the slave apparatus cannot output the second active signal (Step S606). In this case, the abnormal operation is sensed by the master apparatus which monitors the second active signal, so that the second reset signal is supplied to the slave apparatus.

If the second reset signal is received (Step S608), the slave apparatus performs resetting (Step S610). If the normal operation is performed due to the resetting (Step S612), the slave apparatus is inactivated to output the second active signal with a predetermined period and to change the control signal (J port: L, /PRE: H) so that the data of the master apparatus are output, and the slave apparatus monitors the operation state of the master apparatus based on the reception state of the first active signal of the master apparatus (Steps S602, S604, and S616).

During the time when the slave apparatus monitors the reception state of the first active signal while outputting the second active signal with a predetermined period (Step S616), if the first active signal is not normally received, the slave apparatus determines that the master apparatus abnormally operates (Step S618), and the slave apparatus proceeds into an activated state to change the control signal (J port: H, /PRE: L) so that that data of the slave apparatus are output and to transmit the first reset signal to the master apparatus, and the slave apparatus monitors whether or not the first active signal of the master apparatus is normally received (Steps S620 and S622).

After the first reset signal is transmitted, if the slave apparatus normally receives the first active signal, the slave apparatus determines that the master apparatus normally operates. After that, in the case where the slave apparatus is in an abnormal state, in order to allow the data of the master apparatus to be output at the same time when the slave apparatus is reset by the master apparatus, the slave apparatus changes the control signal (J port: H, /PRE port: H) for the control module (Step S626).

What is claimed is:

1. A path multiplexing apparatus in a wireless sensor network comprising:
    a master apparatus;
    a slave apparatus; and
    a control module,
    wherein the control module selectively transmits any one of data supplied by the master apparatus and the slave apparatus to a next system according to control signals supplied by the master apparatus and the slave apparatus,
    wherein in an activated state during normal operation, the master apparatus supplies a control signal for allowing data of the master apparatus to be output and monitors an operation state of the slave apparatus, and in the case where the slave apparatus abnormally operates, the master apparatus supplies a reset signal to the slave apparatus,
    wherein in an inactivated state during normal operation, the slave apparatus monitors an operation state of the master apparatus, and in the case where the master apparatus abnormally operates, the slave apparatus is transitioned into an activated state to supply a reset signal to the master apparatus and supply a control signal for allowing data of the slave apparatus to be output to the control module,
    wherein the control module is configured to include:
    a JK flip-flop which receives control signals from the master apparatus and the slave apparatus as an input and generates a selection signal according to the control signals; and
    a MUX which is supplied with data from the master apparatus and the slave apparatus to selectively output one of two signals according to the selection signal,
    wherein the control signals supplied by the master apparatus are input to a K port and a /CLR port of the JK flip-flop,
    wherein the control signals supplied by the slave apparatus are input to a J port and a /PRE port of the JK flip-flop,
    wherein in the case where the master apparatus is activated and the slave apparatus is inactivated, the control signals input to the J port, the K port, the /PRE port, and the /CLR port and L, H, H, and H signals, and
    wherein in the case where the master apparatus is inactivated and the slave apparatus is activated, the control signals input to the J port, the K port, the /PRE port, and the /CLR port are H, L, H, and H signals.

2. The path multiplexing apparatus in the wireless sensor network according to claim 1,
    wherein during normal operation, the master apparatus supplies an active signal to the slave apparatus at a predetermined period and checks whether or not the slave apparatus abnormally operates according to a reception state of the active signal from the slave apparatus, and
    wherein during normal operation, the slave apparatus supplies an active signal to the master apparatus at a predetermined period and checks whether or not the master apparatus abnormally operates according to a reception state of the active signal from the master apparatus.

3. The path multiplexing apparatus in the wireless sensor network according to claim 1,
    wherein in the case where the master apparatus is reset, the master apparatus is transitioned into an inactivated state to supply a control signal for allowing data of the slave apparatus to be output to the control module and monitors an operation state of the slave apparatus, and in the case where the slave apparatus abnormally operates, the master apparatus is transitioned into an activated state to supply a reset signal to the slave apparatus and to supply a control signal for allowing data of the master apparatus to be output to the control module, and
    wherein in an inactivated state, the slave apparatus supplies a control signal for allowing data of the master apparatus to be output to the control module and monitors an operation state of the master apparatus, and in the case where the master apparatus abnormally operates, the slave apparatus is transitioned into an activated state to supply a reset signal to the master apparatus and to supply a control signal for allowing data of the slave apparatus to be output to the control module.

4. The path multiplexing apparatus in the wireless sensor network according to claim 1,
    wherein the selection signal is configured
    so that data from the master apparatus are output in the case where the master apparatus is activated and the slave apparatus is inactivated,
    so that data from the slave apparatus are output in the case where the master apparatus abnormally operates and the slave apparatus is activated,
    so that data from the slave apparatus are output in the case where the master apparatus is inactivated and the slave apparatus is activated, and so that data from the master apparatus are output in the case where the master apparatus is activated and the slave apparatus abnormally operates.

5. The path multiplexing apparatus in the wireless sensor network according to claim 1,
wherein in the case where the master apparatus abnormally operates and the slave apparatus is activated, the control signals input to the J port, the K port, the /PRE port, and the /CLR port are H, X, L, and X signals, and
wherein in the case where the master apparatus is activated and the slave apparatus abnormally operates, the control signals input to the J port, the K port, the /PRE port, and the /CLR port are X, H, X, and L signals.

6. The path multiplexing apparatus in the wireless sensor network according to claim 4, wherein the control module further includes an oscillator which supplies a driving clock to the JK flip-flop.

7. The path multiplexing apparatus in the wireless sensor network according to claim 1,
wherein the master apparatus or the slave apparatus is a sync node, and
wherein the data are upstream data.

8. The path multiplexing apparatus in the wireless sensor network according to claim 1,
wherein the master apparatus or the slave apparatus is a gateway, and
wherein the data are downstream data.

* * * * *